(12) United States Patent
Phillip et al.

(10) Patent No.: US 6,745,548 B1
(45) Date of Patent: Jun. 8, 2004

(54) SPLIT WIREFORM BAIL

(75) Inventors: Thomas E. Phillip, Hilbert, WI (US);
Paul F. Koltz, Green Bay, WI (US);
Scott Deschler, Kaukauna, WI (US);
Perry Prochnow, Brillion, WI (US);
John Adrian, Oshkosh, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 10/294,070

(22) Filed: Nov. 14, 2002

(51) Int. Cl.$^7$ ............................................... A01D 69/02
(52) U.S. Cl. ....................................................... 56/10.5
(58) Field of Search .............................. 56/10.5, 11.9, 56/14.7, 16.7, 11.3, 11.7; 180/279, 19.3

(56) References Cited

U.S. PATENT DOCUMENTS

| | | |
|---|---|---|
| 2,298,135 A | 10/1942 | Klein |
| 2,521,262 A | 9/1950 | Smith |
| 2,698,507 A | 1/1955 | Siebring |
| 2,702,448 A | 2/1955 | Smith |
| 3,802,170 A | 4/1974 | Seifert et al. |
| 3,841,069 A | 10/1974 | Weck |
| 3,903,679 A | 9/1975 | Sorenson et al. |
| 3,958,398 A | 5/1976 | Fuelling, Jr. et al. |
| 4,090,345 A | 5/1978 | Harkness |
| 4,195,466 A | 4/1980 | Heismann |
| 4,212,141 A | 7/1980 | Miyazawa et al. |
| 4,255,879 A | 3/1981 | Greider |
| 4,281,732 A | 8/1981 | Hoch |
| 4,309,862 A | 1/1982 | Carlson |
| 4,327,539 A | 5/1982 | Bricko et al. |
| 4,335,566 A | 6/1982 | Hurd |
| 4,433,530 A | 2/1984 | Schaefer |
| 4,466,232 A | 8/1984 | Beugelsdyk et al. |
| 4,476,643 A | 10/1984 | Hilchey et al. |
| 4,531,347 A | 7/1985 | Schutz |
| 4,704,847 A | 11/1987 | Greider et al. |
| 4,869,124 A | 9/1989 | Czeban et al. |
| 4,878,339 A | 11/1989 | Marier et al. |
| 4,882,897 A | 11/1989 | Oshima et al. |
| 5,088,273 A | 2/1992 | Braun et al. |
| 5,203,147 A | 4/1993 | Long |
| 5,343,678 A | 9/1994 | Stuart |
| 5,375,674 A | 12/1994 | Peter |
| 5,511,367 A | 4/1996 | Powers et al. |
| 5,701,967 A | 12/1997 | Barnard |
| D424,578 S | 5/2000 | Friberg et al. |
| 6,082,083 A | 7/2000 | Stalpes et al. |
| 6,105,348 A | 8/2000 | Turk et al. |

OTHER PUBLICATIONS

Ariens, "Walk Behind Lawn Mower", Owner/Operator Manual, Feb. 2002, Issue No. 01196300D, 27 pages, Printed in the USA.

*Primary Examiner*—Robert E. Pezzuto
(74) *Attorney, Agent, or Firm*—Michael Best & Friedrich LLP

(57) ABSTRACT

A control apparatus for an implement such as a snow thrower, the control apparatus comprising a handle having at least two substantially upright portions and a cross portion extending between the upright portions. A first bail is pivotally connected to both upright portions of the handle to pivot about a first axis. A second bail is also pivotally connected to both upright portions of the handle to pivot about a second axis that is not co-linear with the first axis. The first and second bails are both separately movable between an engaged condition and a disengaged condition. Both the first and second bails are independently operable from one another, and move in the same direction with respect to the handle when moving from the disengaged condition to the engaged condition. The first bail may control a first mechanism, and the second bail may control a second mechanism.

44 Claims, 5 Drawing Sheets

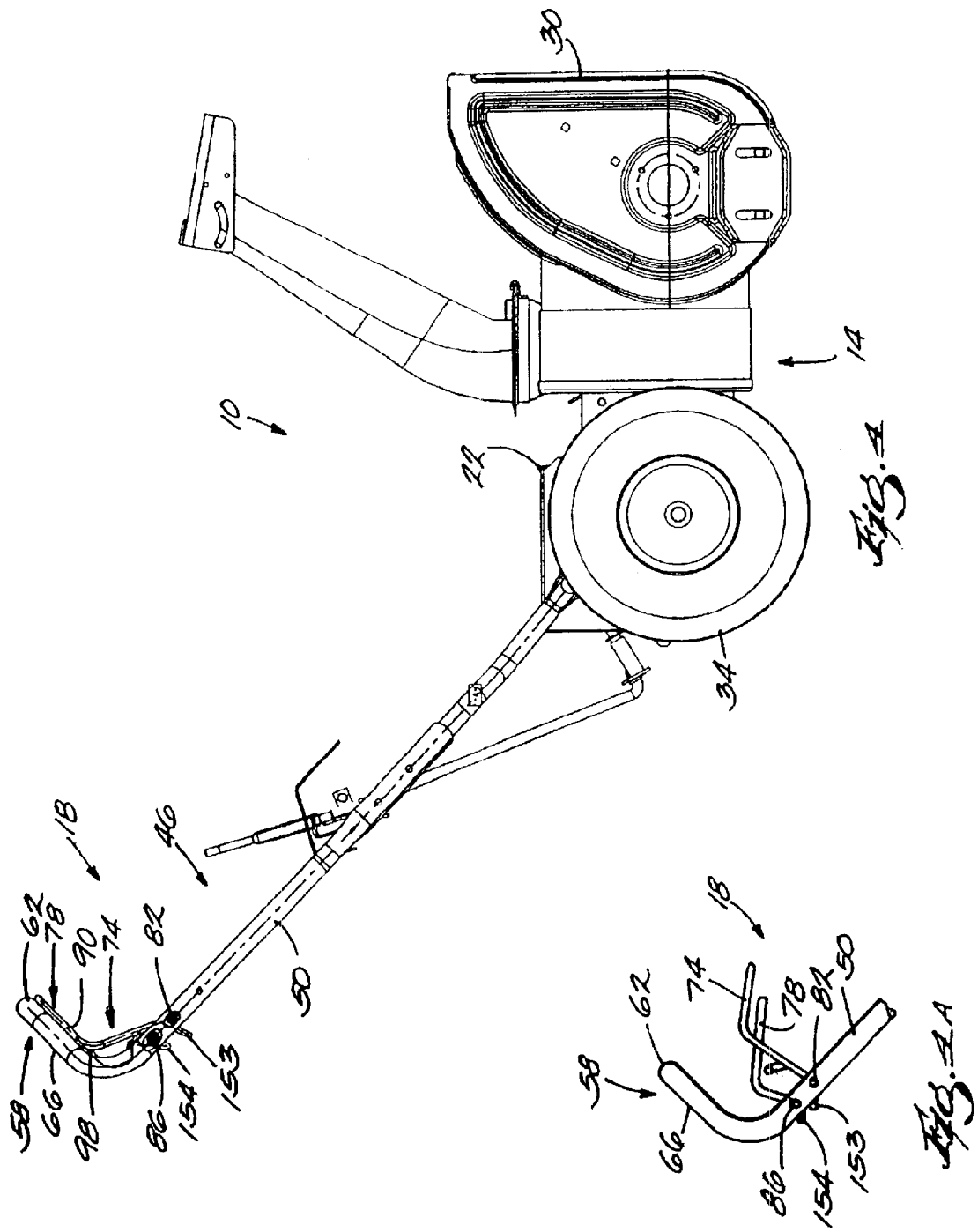

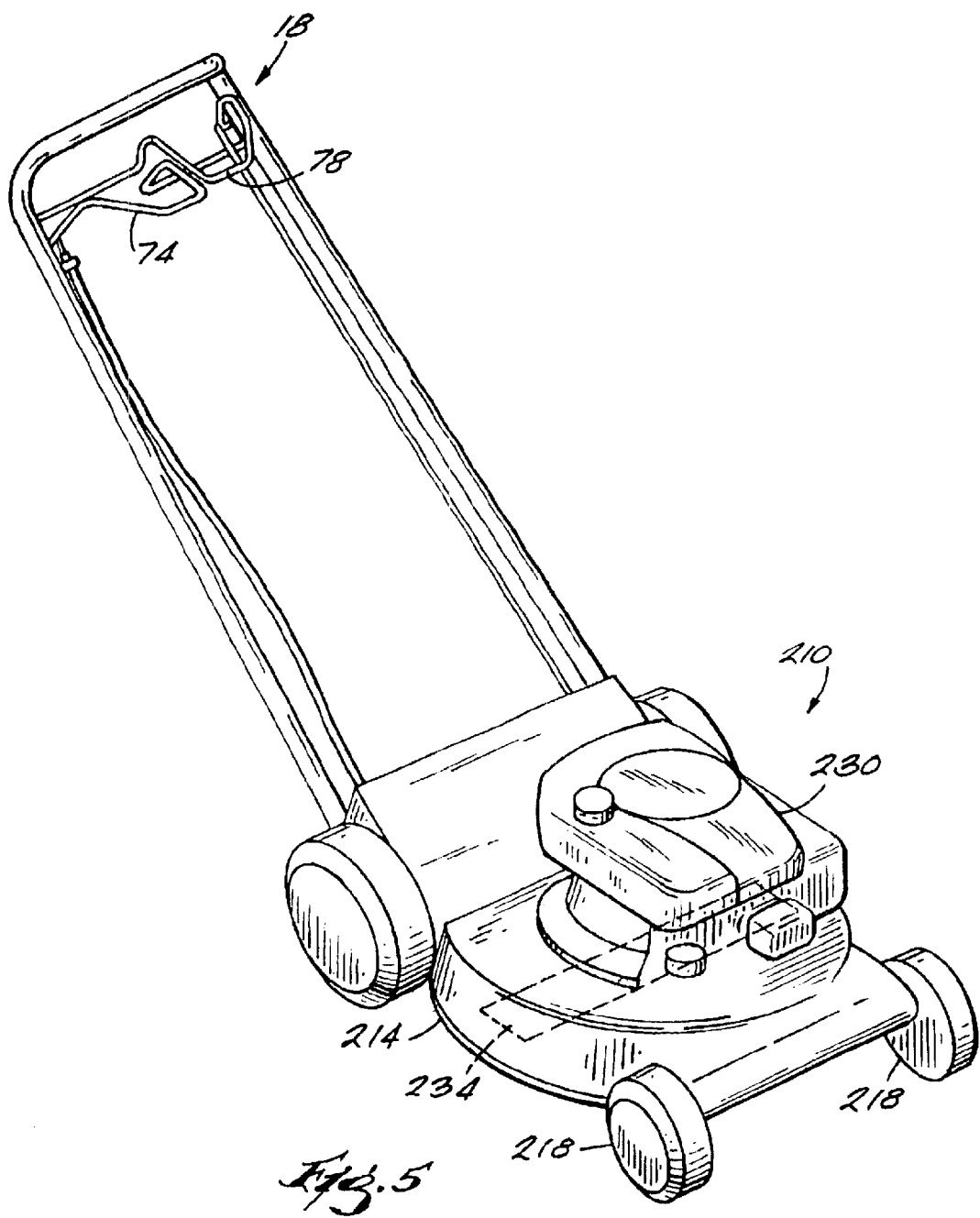

US 6,745,548 B1

SPLIT WIREFORM BAIL

FIELD OF THE INVENTION

This invention relates to a control apparatus for outdoor power implements, and more particularly to a control apparatus for outdoor power implements such as utility tractors, lawnmowers, landscaping equipment, trimmers, tillers, snow throwers, or other similar implements.

BACKGROUND OF THE INVENTION

Power implements commonly include devices such as utility tractors, lawnmowers, landscaping equipment, trimmers, tillers, snow throwers, or other similar implements, and are used for general outdoor applications such as landscaping, gardening, lawn care, or snow removal. The implement includes at least one mechanism to perform the desired application. If the implement is self-propelled, the implement also includes a drive mechanism to propel the implement. For example, if the implement is a snow thrower, the snow thrower may include a drive mechanism, such as drive wheels or treads, to propel the snow thrower across a surface, and an auger to remove snow from the surface.

SUMMARY OF THE INVENTION

The present invention provides a control apparatus comprising a handle having at least two substantially upright portions and a cross portion extending between the upright portions. A first bail is pivotally connected to both upright portions of the handle to pivot about a first axis. A second bail is also pivotally connected to both upright portions of the handle to pivot about a second axis that is non-collinear with the first axis. The first bail and second bail are both separately movable between an engaged condition and a disengaged condition. Both the first bail and the second bail are independently operable from one another, and move in the same direction with respect to the handle when moving from the disengaged condition to the engaged condition.

The control apparatus may be included in an implement, such as a snow thrower or lawnmower, to control a first mechanism and a second mechanism with the first and second bails, respectively. For example, on a snow thrower, the first mechanism may be an auger, and the second mechanism may be a drive mechanism. Since each bail is independently operable, the first and second mechanisms may be controlled separately from one another, regardless of the condition of the other bail. The first bail and the second bail each extend between and are pivotally connected to both upright portions.

Other features and advantages of the present invention will become apparent to those skilled in the art upon review of the following detailed description and drawings.

BRIEF DESCRIPTION OF THE DRAWINGS

FIG. 4 is a side view of the snow thrower having a control apparatus of FIG. 1.

FIG. 4A is a side view of the control apparatus of FIG. 4.

FIG. 5 is a perspective view of a lawnmower having a control apparatus embodying the present invention.

Figure 1:
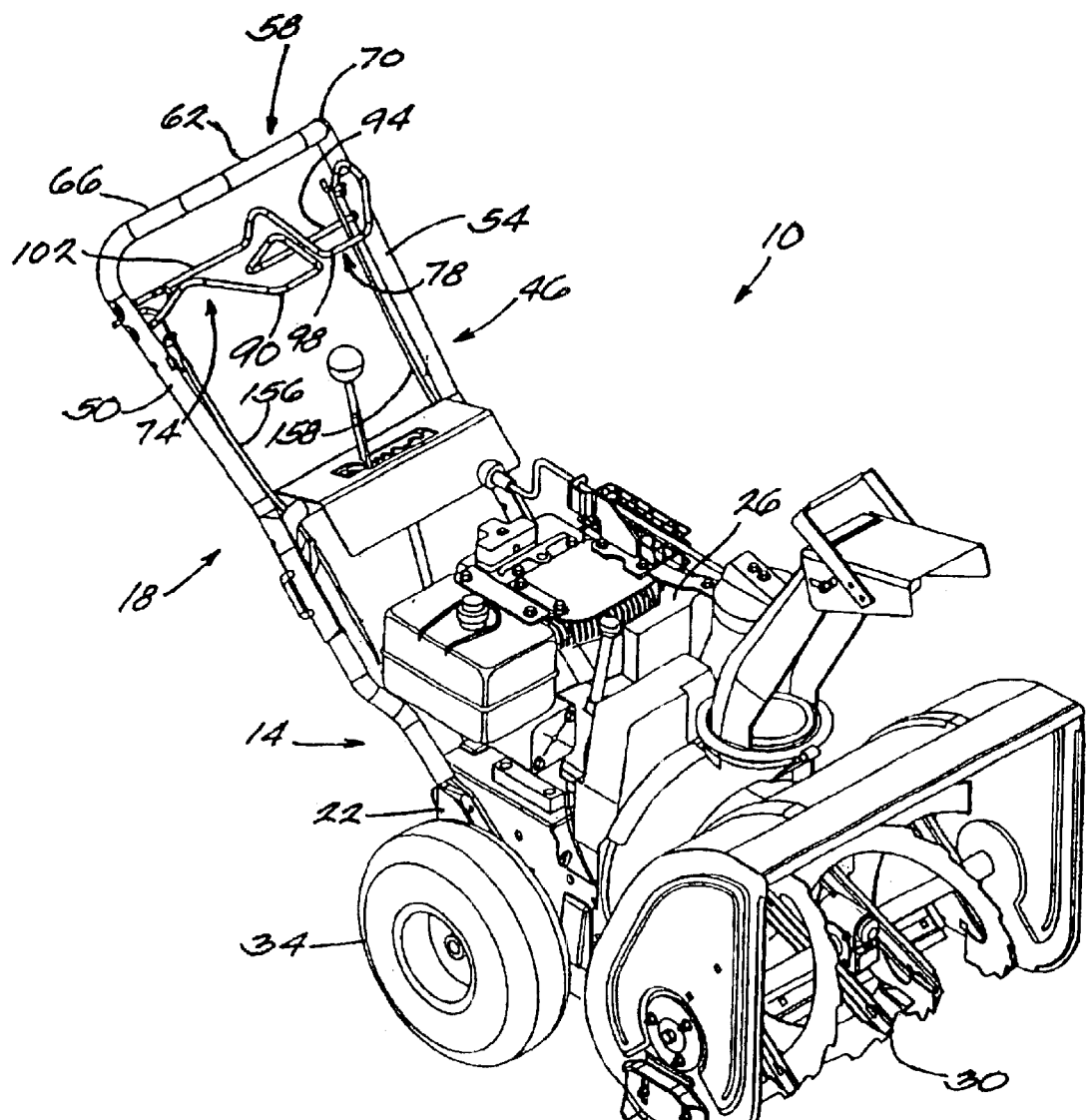
FIG. 1 is a perspective view of a snow thrower having a control apparatus embodying the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates an implement and control apparatus embodying the present invention. In FIG. 1, the implement is illustrated as a snow thrower 10, but the invention can also be embodied in other power implements, such as utility tractors, lawnmowers, landscaping equipment, trimmers, tillers, or other similar implements. In FIG. 1, the snow thrower 10 includes a body 14 and a control apparatus 18. An operator uses the control apparatus 18 to control the snow thrower 10. The body 14 includes a frame 22 and an engine 26 that drives a first and second mechanism. In the illustrated embodiment, the snow thrower 10 is a self-propelled snow thrower, and the first mechanism includes an auger 30 and the second mechanism includes a drive mechanism 34. In FIG. 1, the drive mechanism 34 includes a wheel drive, but other drive mechanisms, such as treads, could also be used.

The control apparatus 18 includes a handle 46 extending outwardly and upwardly from the body 14. The handle 46 has at least two substantially upright portions 50, 54, and a cross portion 58 extending between the upright portions 50, 54. In the illustrated embodiment, the cross portion 58 is contoured to provide an ergonomically comfortable grip at desired orientations for the operator's hands. The cross portion 58 includes an upper portion 62 near the middle of the cross portion 58, and two angled portions 66, 70 that extend from the upper portion 62 to the respective upright portion 50, 54. In this regard, the cross portion 58 may be termed generally trapezoidal in shape. The upper portion 62 and the angled portions 66, 70 are each long enough to permit the operator to grip any part of the cross portion 58.

Figure 2:
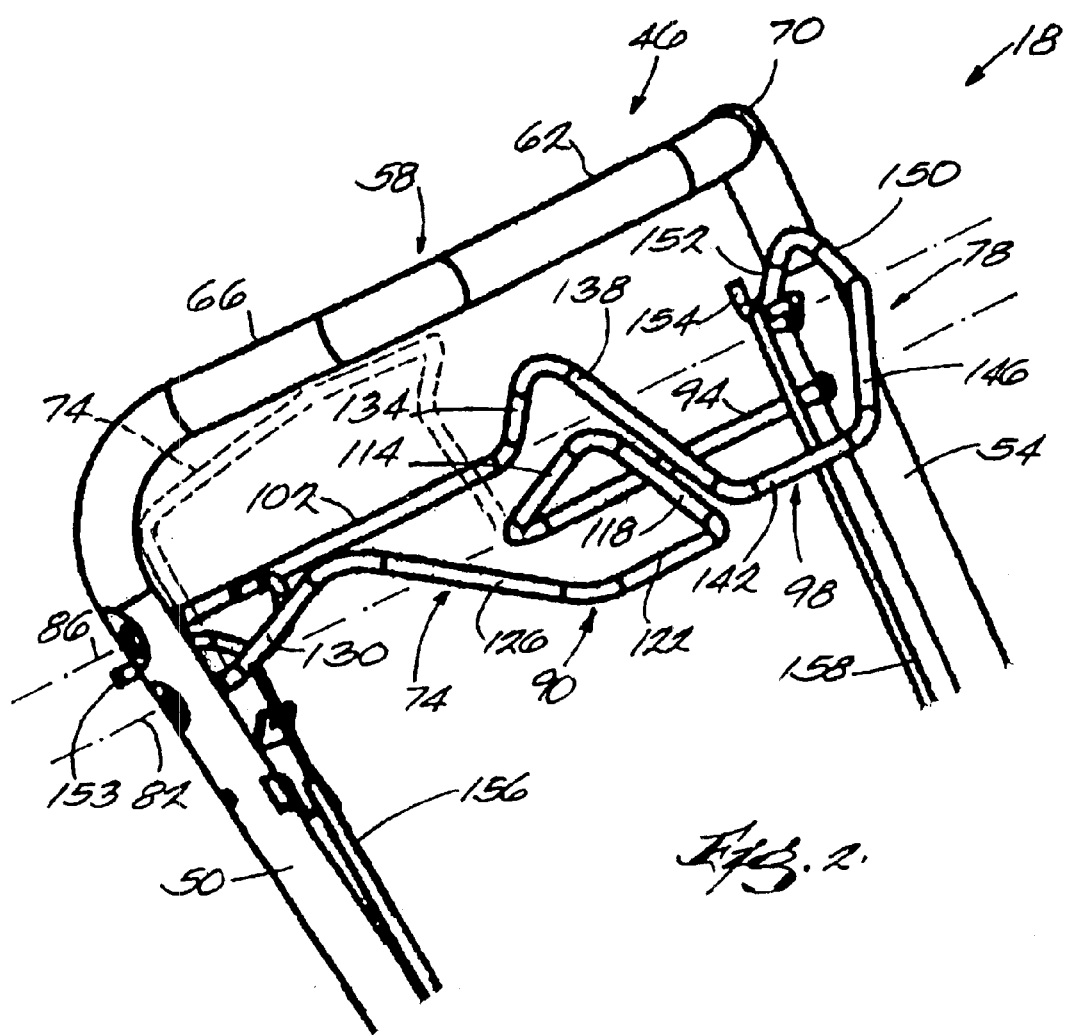
FIG. 2 is an enlarged view of the control apparatus of FIG. 1.

FIG. 2 illustrates an enlarged view of the control apparatus 18. The control apparatus 18 includes a first bail 74 and a second bail 78 extending between the upright portions 50, 54. The first and second bails 74, 78 are pivotally connected to both upright portions 50, 54 and pivot about respective first and second pivot axes 82, 86 that are generally parallel and non-collinear to each other. Although the first pivot axis 82 is lower on the handle 46 than the second pivot axis 86, the first bail 74 is taller than and extends higher than the second bail 78, as viewed from the side (FIG. 4A), when the bails 74, 78 are in a disengaged condition.

The first bail 74 includes a first handle portion 90 and a first connection portion 94. The first handle portion 90 extends about half-way between the upright portions 50, 54, and the first connection portion 94 extends the remainder of the distance between the upright portions 50, 54. The first connection portion 94 extends along the first pivot axis 82, and the first handle portion 90 extends away from the first pivot axis 82, and is therefore a lever that facilitates pivoting the first bail 74 about the first pivot axis 82.

The second bail 78 includes a second handle portion 98 and a second connection portion 102. The second handle portion 98 extends about half-way between the upright portions 50, 54, and the second connection portion 102 extends the remainder of the distance between the upright portions 50, 54. The second connection portion 102 extends along the second pivot axis 86, and the second handle portion 98 extends away from the second pivot axis 86. In this regard, the second handle portion 98 is a lever that facilitates pivoting the second bail 78 about the second pivot axis 86.

Figure 3:
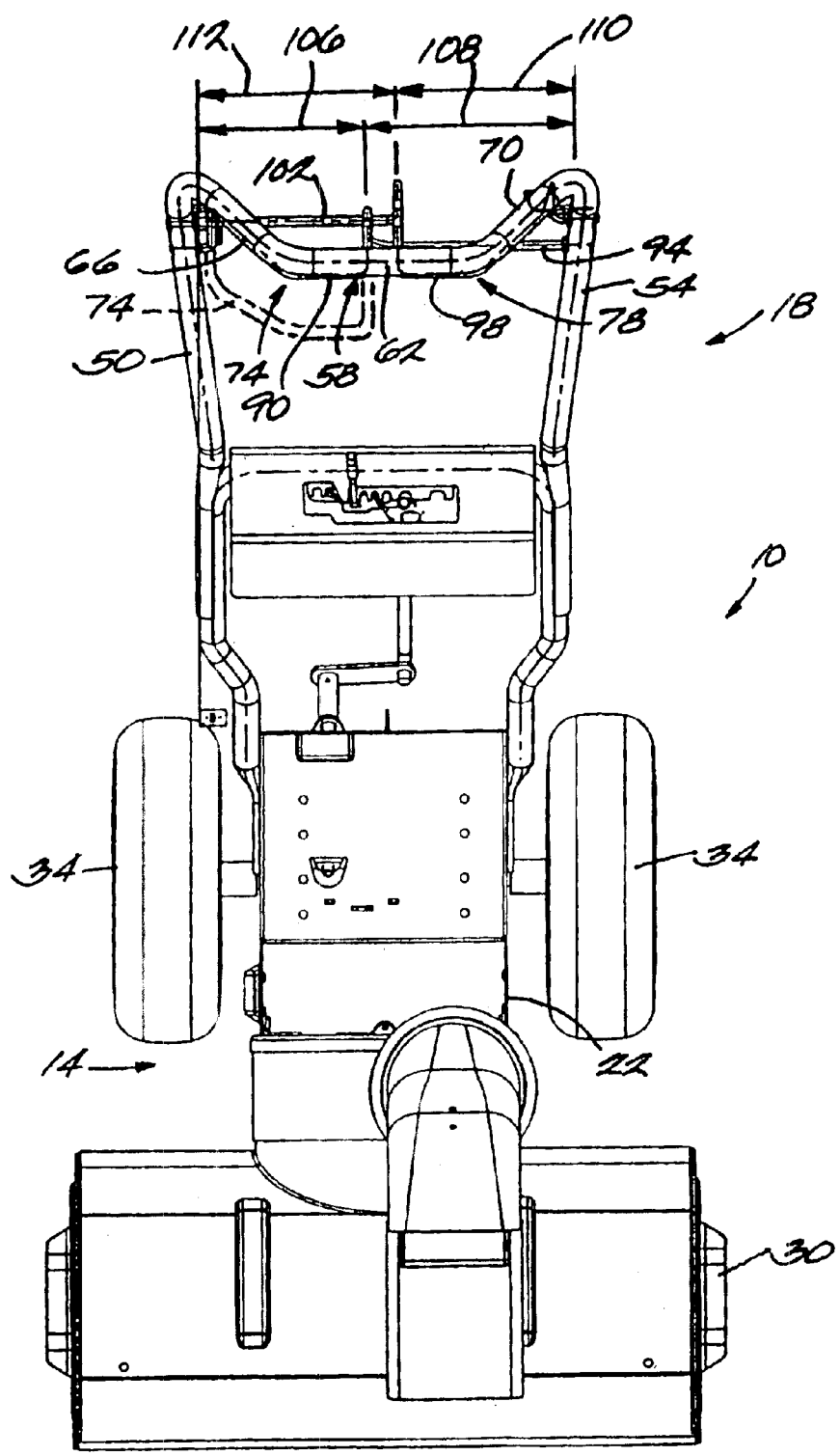
FIG. 3 is a top view of the snow thrower having a control apparatus of FIG. 1.

FIG. 3 illustrates a view of the top of the snow thrower 10 without the engine 26 (FIG. 1). The first handle portion 90 includes a length 106, and the first connection portion 94 includes a length 108. The second handle portion 98 includes a length 110, and the second connection portion 102 includes a length 112. The sum of length 106 and length 110 is approximately equal to, or slightly less than, the distance between the upright portion 50, 54. Similarly, the sum of the length of the first connection portion 94 and the length of the second connection portion 102 is approximately equal to, or slightly more than, the distance between the upright portion 50, 54.

The first bail 74 and the second bail 78 each pivot between an engaged condition and a disengaged condition. FIGS. 3 and 4 illustrate the first bail 74 and the second bail 78 in the engaged condition with the first handle portion 90 and second handle portion 98 adjacent the cross portion 58. FIG. 3 illustrates the first bail 74 in the disengaged condition in phantom. FIGS. 1–2 and 4A illustrate the first bail 74 and second bail 78 in the disengaged condition with the first handle portion 90 and second handle portion 98 pivoted away from the cross portion 58. FIG. 2 illustrates the first bail 74 in the engaged condition in phantom. As the first and second bails 74, 78 move from the disengaged condition to the engaged condition, the first bail 74 and second bail 78 move in the same direction with respect to the handle 46 and pivot toward the cross portion 58.

As shown in FIG. 3, the second connection portion 102 extends beyond the first handle portion 90 in relation to the upright portion 50 to provide clearance for the first handle portion 90 to move between the disengaged and engaged conditions. Similarly, the first connection portion 94 extends beyond the second handle portion 98 in relation to the upright portion 54 to provide clearance for the second handle portion 98 to move between the disengaged and engaged condition. In other words, although the first bail 74 is axially interconnected below the second bail 78, the first bail 74 is able to pivot past the second bail 78 when moving to the engaged condition while the second bail 78 is in the disengaged condition. This is possible because length 112 is greater than length 106, and length 108 is greater than length 110, as shown in FIG. 3. The first and second bail 74, 78, therefore, are movable into the engaged and disengaged conditions regardless of the condition of the other bail.

The first handle portion 90 and second handle portion 98 contour the shape of the cross portion 58. As shown in FIG. 2, the first connection portion 94 extends from the upright portion 54 to approximately half-way between the upright portions 50, 54, and the handle portion 90 extends from the first connection portion 94 to upright portion 50. The first handle portion 90 comprises a first grip portion, a first end portion extending between the upright portion 50 and the first grip portion, and a first middle portion extending between the first grip portion and the first connection portion 94. The first handle portion 90 includes several segments 114, 118, 122, 126, 130 extending at various angles from one another. The first grip portion includes segment 122, the first end portion includes segments 126 and 130, and the first middle portion includes segment 114 and 118.

In the illustrated embodiment, segment 122, or the first grip portion, is substantially parallel to the first connection portion 94. The first connection portion 94, and segments 114 and 130 are substantially co-planar, and segments 118, 122, 126 are substantially co-planar. When the first bail 74 is in the engaged condition, segment 122 is adjacent the upper portion 62, and segment 126 is adjacent the angled portion 66. The angle between segment 122 and segment 126 is substantially the same as the angle between the upper portion 62 and the angled portion 66.

The second connection portion 102 extends from the upright portion 50 to approximately half-way between the upright portions 50, 54, and the second handle portion 98 extends from the second connection portion 102 to upright portion 54. The second handle portion 98 comprises a second grip portion, a second end portion extending between the second upright portion 54 and the second grip portion, and a second middle portion extending between the second grip portion and the second connection portion 102. The second handle portion 98 also includes several segments 134, 138, 142, 146, 150, 152 extending at various angles from one another. The first grip portion includes segment 142, the second end portion includes segments 146, 150 and 152, and the second middle portion includes segments 134 and 138.

In the illustrated embodiment, segment 142, or the second grip portion, is substantially parallel to the second connection portion 102. The second connection portion 102 and segments 134 and 152 are substantially co-planar, and segments 138, 142, 146, 150 are substantially co-planar. When the second bail 78 is in the engaged condition, segment 142 is adjacent the upper portion 62, and segment 146 is adjacent the angled portion 70. The angle between segment 142 and segment 146 is substantially the same as the angle between the upper portion 62 and the angled portion 70. Alternatively, the cross portion 58 could have a rounded shape, and the first handle portion 90 and second handle portion 98 could also have a rounded shape to contour the rounded cross portion 58.

The configuration of the bails 74, 78 permits them to be made from a metal rod material. The bails 74, 78 may be formed by bending the rod into the desired shape of the bails 74, 78 having various segments as described above and illustrated in FIGS. 1–4. Since the bails 74, 78 are each connected to each upright portion 50, 54 and the pivot axes 82, 86 are non-collinear, the bent bails 74, 78 have sufficient strength and stability for this application.

Each bail 74, 78 is movable past the other bail 74, 78 in relation to the handle 46 while moving from the disengaged condition to the engaged condition when the other bail 74, 78 remains in the disengaged condition. The second pivot axis 86 is higher on the handle 46 than the first pivot axis 82. When the second bail 78 is in the disengaged condition and the first bail 74 is pivoted toward the engaged condition, a portion of the first handle portion 90 pivots through a plane including the second connection portion 102 and at least a portion of the second handle portion 98, such as segment 134. When the first bail 74 is engaged and the second bail 78 is disengaged, the second handle portion 98 is further from the cross portion 58 than the first handle portion 90, but the first connection portion 94 is further from the cross portion 58 than the second connection portion 102. Therefore, the first bail 74 moves past the second bail 78 in relation to the handle 46 when the first bail 74 moves from the disengaged condition to the engaged condition and the second bail 78 remains in the disengaged condition.

Similarly, when the first bail 74 is in the engaged condition and the second bail 78 is pivoted toward the engaged condition, a portion of the second handle portion 98 pivots through a plane including at least a portion of the first handle portion 90, such as segments 188 and 122. The distance between segment 122 of the first handle portion 90 and the first pivot axis 82 is less than the distance between segment 142 of the second handle portion 98 and the second pivot axis 86. Because this relative distance is less, segment 142 may be disposed vertically lower than segment 122 when both bails 74, 78 are in the disengaged condition. Therefore, the second bail 78 moves past the first bail 74 in relation to the handle 46 when the second bail 78 moves from the disengaged condition to the engaged condition and the first bail 74 is in the disengaged condition.

Additionally, each bail 74, 78 also moves bail the other bail 74, 78 when moving from the engaged condition to the disengaged condition. When both bails 74, 78 are in the engaged condition, the second bail 78 moves past the first bail 74 when moving from the engaged condition to the disengaged condition while the first bail 74 remains in the engaged condition. The reverse is also true with the first bail 74 moving past the second bail 78 when moving from the engaged condition to the disengaged condition while the second bail 78 remains in the engaged condition.

The bails 74, 78 include first and second stops 153, 154 to resist movement of the bails 74, 78 beyond the disengaged condition when moving away from the cross portion 58. The stops 153, 154 contact the side of the upright portions 50, 54 opposite the handle portions 90, 98. The first bail 74 includes the first stop 153 near the pivotal connection between the first bail 74 and upright portion 50. The second bail 78 includes the second stop near the pivotal connection between the second bail 78 and upright portion 54. The stops 153, 154 may include protective coverings, such as plastic, to resist scratching of surface finish on the contacting parts.

In operation, the first bail 74 actuates the auger 30 when the first bail 74 is moved to the engaged condition, and the second bail 78 actuates the drive mechanism 34 when the second bail 78 is moved to the engaged condition. The first bail 74 and the second bail 78 are biased toward the disengaged condition. The first and second bails 74, 78 are disposed in close enough proximity such that the operator may pull back and hold both bails 74, 78 in the engaged condition with one hand.

The first bail 74 may be connected to the auger 30 with a first cable 156 to actuate the auger 30, and the second bail 78 may be connected to the drive mechanism 34 with a second cable 158 to actuate the drive mechanism 34. As mentioned above, the engine 26 drives the auger 30 and drive mechanism 34. The cables 156, 158 may connect to a clutch, or other interconnection means, that selectively transfers power from the engine 26 to the mechanisms 30, 34. Alternatively, other connection means, such as rods or levers, may also be used in place of the cables 156, 158 to connect the bails 74, 78 to the mechanisms 30, 34.

The first bail 74 and the second bail 78 are independently operable, and may be actuated separately or together. The first bail 74 may move freely between the disengaged and engaged condition regardless of whether the second bail 78 is in the disengaged or engaged condition. Similarly, the second bail 78 may move freely between the disengaged and engaged condition regardless of whether the first bail 74 is in the disengaged or engaged condition. Therefore, the first mechanism 30 may be operated while the second mechanism 34 is disengaged, and the drive mechanism 34 may be operated without engaging the auger 30.

FIG. 4 illustrates a side view of the snow thrower 10 without the engine 26 (FIG. 1), and with the bails 74, 78 in the engaged condition. In the illustrated embodiment, the bails 74, 78 have a generally L-shaped profile when viewed from the side. The L-shaped profile permits the handle portions 90, 98 of the bails 74, 78 to be positioned adjacent the upper portion 62 and angled portions 66, 70 along substantially the entire length of the angled cross portion 58 when the bails 74, 78 are in the engaged condition.

FIG. 5 illustrates another embodiment of an implement and control apparatus embodying the present invention. In FIG. 5, the implement is illustrated as a lawnmower 210 including the control apparatus 18. The control apparatus 18 incorporated in the lawnmower 210 includes the first bail 74 and the second bail 78 and is substantially the same as the control apparatus 18 described above. The lawnmower 210 includes a mower deck 214 supported by front wheels 218 and a first rear wheel 222 and second rear wheel 226. An engine 230 is supported by the mower deck 214 and drives a cutting blade 234 below the mower deck 214.

Similar to the embodiment described above, the first bail 74 may control a first mechanism and the second bail 78 may control a second mechanism. The bails 74, 78 are separately operable, and each bail 74, 78 may be moved between a disengaged condition and engaged condition regardless of the condition of the other bail 74, 78. In the illustrated embodiment, the first mechanism may be the cutting blade 234, and the second mechanism may be a driving mechanism that drives the rear wheels 222, 226. A clutch mechanism may also be incorporated to control the cutting blade 234 with one of the bails 74, 78. Alternatively, one of the bails 74, 78 may be a dead man control to limit operation of the lawnmower 210 when an operator is not at the controls.

The control apparatus 18 may also be used to control the drive mechanism of a lawnmower having separate drive mechanism for each side, such as a zero radius turn lawnmower. In this embodiment, the first bail 74 controls a first drive mechanism driving rear wheel 222, and the second bail 78 controls a second drive mechanism driving rear wheel 226. This arrangement permits greater directional control of the lawnmower 210, and may be particularly useful on relatively larger lawnmowers, such as lawnmowers having multiple cutting blades.

The foregoing detailed description describes only a few of the many forms that the present invention can take, and should therefore be taken as illustrative rather than limiting. It is only the claims, including all equivalents that are intended to define the scope of the invention.

What is claimed is:

1. A control apparatus comprising:
a handle having at least two substantially upright portions including a first upright portion and a second upright portion, and a cross portion extending between the upright portions;
a first bail pivotally connected to both upright portions of the handle to pivot about a first axis, the first bail movable between an engaged condition and a disengaged condition; and
a second bail pivotally connected to both upright portions of the handle to pivot about a second axis that is non-collinear with the first axis, the second bail movable between an engaged condition and a disengaged condition;
wherein the first and second bails are movable into the engaged and disengaged conditions regardless of the condition of the other bail, wherein the first and second bails move in the same direction with respect to the handle when being moved from the disengaged condition to the engaged condition.

2. The control apparatus of claim 1, wherein the first and second bail are both disposed forward of the handle.

3. The control apparatus of claim 1, wherein the first bail includes a first handle portion extending about half-way between the upright portions, the first handle portion being adjacent the cross portion when the first bail is in the engaged condition and pivoted away from the cross portion when the first bail is in the disengaged condition, and wherein the second bail includes a second handle portion extending about half-way between the upright portions, the second handle portion being adjacent the cross portion when the second bail is in the engaged condition and pivoted away from the cross portion when the second bail is in the disengaged condition.

4. The control apparatus of claim 3, wherein the first handle portion has a first length, and the second handle has a second length, and the sum of the first length and the second length is approximately equal to the length of the cross portion.

5. The control apparatus of claim 3, wherein the first bail includes a first connection portion such that the first handle portion extends from the first upright portion, and the first connection portion extends between the first handle portion and the second upright portion, and the second bail includes a second connection portion such that the second handle portion extends from the second upright portion, and the second connection portion extends between the second handle portion and the first upright portion, and the second connection portion extends beyond the first handle portion with respect to the first upright portion, and the first connection portion extends beyond the second handle portion with respect to the second upright portion.

6. The control apparatus of claim 5, wherein the first handle portion comprises a first grip portion extending substantially parallel to the first connection portion, a first end portion extending between the first upright portion and the first grip portion, and a first middle portion extending between the first grip portion and the first connection portion.

7. The control apparatus of claim 5, wherein the second handle portion comprises a second grip portion extending substantially parallel to the second connection portion, a second end portion extending between the second upright portion and the second grip portion, and a second middle portion extending between the second grip portion and the second connection portion.

8. The control apparatus of claim 1, wherein both the first bail and the second bail are biased toward the disengaged condition.

9. The control apparatus of claim 1, wherein the bails are made from a metal rod bent into the shape of wireform bail handles.

10. A control apparatus comprising:
a handle having at least two substantially upright portions including a first upright portion and a second upright portion, and a cross portion extending between the upright portions;
a first bail pivotally connected to both upright portions of the handle to pivot about a first axis, the first bail movable between an engaged condition and a disengaged condition; and
a second bail pivotally connected to both upright portions of the handle to pivot about a second axis that is non-collinear with the first axis, the second bail movable between an engaged condition and a disengaged condition;
wherein at least one of the first and second bail are movable past the other bail when being moved between the engaged condition and the disengaged condition.

11. The control apparatus of claim 10, wherein the first bail is movable past the second bail in relation to the handle when the first bail moves from the disengaged condition to the engaged condition and the second bail is in the disengaged condition.

12. The control apparatus of claim 10, wherein the second bail is movable past the first bail in relation to the handle when the second bail moves from the disengaged condition to the engaged condition and the first bail is in the disengaged condition.

13. The control apparatus of claim 10, wherein the second bail is movable past the first bail in relation to the handle when the second bail moves from the engaged condition to the disengaged condition and the first bail is in the engaged condition.

14. The control apparatus of claim 10, wherein the first and second bails move in the same direction with respect to the handle when moving from the disengaged condition to the engaged condition.

15. The control apparatus of claim 10, wherein the first and second bail are both disposed forward of the handle.

16. The control apparatus of claim 10, wherein the first bail includes a first handle portion extending about half-way between the upright portions, the first handle portion being adjacent the cross portion when the first bail is in the engaged condition and pivoted away from the cross portion when the first bail is in the disengaged condition, and wherein the second bail includes a second handle portion extending about half-way between the upright portions, the second handle portion being adjacent the cross portion when the second bail is in the engaged condition and pivoted away from the cross portion when the second bail is in the disengaged condition.

17. The control apparatus of claim 16, wherein the first handle portion has a first length, and the second handle has a second length, and the sum of the first length and the second length is approximately equal to the length of the cross portion.

18. The control apparatus of claim 16, wherein the first bail includes a first connection portion such that the first handle portion extends from the first upright portion, and the first connection portion extends between the first handle portion and the second upright portion, and the second bail includes a second connection portion such that the second handle portion extends from the second upright portion, and the second connection portion extends between the second handle portion and the first upright portion, and the second connection portion extends beyond the first handle portion with respect to the first upright portion, and the first connection portion extends beyond the second handle portion with respect to the second upright portion.

19. The control apparatus of claim 18, wherein the first handle portion comprises a first grip portion extending substantially parallel to the first connection portion, a first end portion extending between the first upright portion and the first grip portion, and a first middle portion extending between the first grip portion and the first connection portion.

20. The control apparatus of claim 18, wherein the second handle portion comprises a second grip portion extending substantially parallel to the second connection portion, a second end portion extending between the second upright portion and the second grip portion, and a second middle portion extending between the second grip portion and the second connection portion.

21. The control apparatus of claim 10, wherein both the first bail and the second bail are biased toward the disengaged condition.

22. The control apparatus of claim 10, wherein the bails are made from a metal rod bent into the shape of wireform bail handles.

23. An implement comprising:
a body including a first mechanism and a second mechanism;
a handle extending outwardly from the body and having at least two upright portions and a cross portion extending between the upright portions;
a first bail pivotally connected to both upright portions of the handle to pivot about a first axis, the first bail movable between an engaged condition and a disengaged condition to control the first mechanism, wherein the first mechanism is actuated when the first bail is in the engaged condition; and
a second bail pivotally connected to both upright portions of the handle to pivot about a second axis that is non-collinear with the first axis, the second bail movable between an engaged condition and a disengaged condition to control the second mechanism, wherein the second mechanism is actuated when the second bail is in the engaged condition, wherein the first and second bails are movable into the engaged and disengaged conditions regardless of the condition of the other bail.

24. The implement of claim 23, wherein the first and second bails move in the same direction with respect to the handle when moving from the disengaged condition to the engaged condition.

25. The implement of claim 23, wherein the first and second bail are both disposed forward of the handle.

26. The implement of claim 23, wherein the first bail is movable past the second bail in relation to the handle when the first bail moves from the disengaged condition to the engaged condition and the second bail is in the disengaged condition; and the second bail is movable past the first bail in relation to the handle when the second bail moves from the disengaged condition to the engaged condition and the first bail is in the disengaged condition.

27. The implement of claim 23, wherein the implement includes a snow thrower.

28. The implement of claim 23, wherein at least one of the first mechanism and the second mechanism includes an auger, and the other of the first mechanism and the second mechanism includes a drive mechanism.

29. The implement of claim 23, wherein the first bail and the second bail move in the same direction with respect to the handle when moving from the disengaged condition to the engaged condition.

30. The implement of claim 23, wherein the first bail includes a first handle portion extending about half-way between the upright portions, and the first handle portion is adjacent the cross portion when the first bail is in the engaged condition, and the first handle portion is pivoted away from the cross portion when the first bail is in the disengaged condition, and the second bail includes a second handle portion extending about half-way between the upright portions, and the second handle portion is adjacent the cross portion when the second bail is in the engaged condition, and the second handle portion is pivoted away from the cross portion when the second bail is in the disengaged condition.

31. The implement of claim 23, wherein the first handle portion has a first length, and the second handle portion has a second length, and the sum of the first length and the second length is approximately equal to the length of the cross portion.

32. The implement of claim 23, wherein both the first bail and the second bail are biased toward the disengaged condition.

33. The implement of claim 23, wherein the implement includes a lawn mower.

34. The implement of claim 33, wherein at least one of the first mechanism and the second mechanism includes a cutting blade, and the other of the first mechanism and the second mechanism includes a drive mechanism.

35. The implement of claim 33, wherein the first mechanism includes a first drive mechanism, and the second mechanism includes a second drive mechanism.

36. The implement of claim 23, wherein the bails are made from a metal rod bent into the shape of wireform bail handles.

37. A snow thrower comprising:
a body including an auger and a drive mechanism;
a handle extending outward from the body and having at least two upright portions and a cross portion extending between the upright portions;
a first bail pivotally connected to both upright portions of the handle to pivot about a first axis, the first bail movable between an engaged condition and a disengaged condition to control the drive mechanism, wherein the drive mechanism is actuated when the first bail is in the engaged condition; and
a second bail pivotally connected to both upright portions of the handle to pivot about a second axis that is non-collinear with the first axis, the second bail movable between an engaged condition and a disengaged condition to control the auger, wherein the auger is actuated when the second bail is in the engaged condition, wherein the first and second bails are movable into the engaged and disengaged conditions regardless of the condition of the other bail.

38. The snow thrower of claim 37, wherein the first bail and the second bail move in the same direction with respect to the handle when moving from the disengaged condition to the engaged condition.

39. The snow thrower of claim 37, wherein the first bail includes a first handle portion extending about half-way between the upright portions, and the first handle portion is adjacent the cross portion when the first bail is in the engaged condition, and the first handle portion is pivoted away from the cross portion when the first bail is in the disengaged condition, and the second bail includes a second handle portion extending about half-way between the upright portions, and the second handle portion is adjacent the cross portion when the second bail is in the engaged condition, and the second handle portion is pivoted away from the cross portion when the second bail is in the disengaged condition.

40. The snow thrower of claim 39, wherein the first handle portion has a first length, and the second handle portion has a second length, and the sum of the first length and the second length is approximately equal to the length of the cross portion.

41. The snow thrower of claim 39, wherein each bail includes a connecting portion extending along the respective first and second pivot axes and interconnecting the respective handle portions with one of the at least two upright portions.

42. The snow thrower of claim 41, wherein the connection portions of the second bail provides clearance for the handle portion of the first bail to pivot past the handle portion of the second bail.

43. The snow thrower of claim 39, wherein both the first bail and the second bail are biased toward the disengaged condition.

44. The snow thrower of claim 37, wherein the bails are made from a metal rod bent into the shape of wireform bail handles.

* * * * *